United States Patent
Walker, Jr.

[11] 3,753,068
[45] Aug. 14, 1973

[54] CONTROLLED SPEED ELECTRIC MOTOR

[75] Inventor: Peter Walker, Jr., Brooklyn, Minn.

[73] Assignee: Electro-Craft Corporation, Hopkins, Minn.

[22] Filed: Nov. 9, 1971

[21] Appl. No.: 197,055

[52] U.S. Cl.................. 318/338, 310/181, 318/350
[51] Int. Cl. ............................................. H02p 5/06
[58] Field of Search.................... 310/155, 181, 154; 318/336, 337, 338, 350, 351, 359, 493, 528, 532

[56] References Cited
UNITED STATES PATENTS

| | | | |
|---|---|---|---|
| 3,426,224 | 2/1969 | Esters | 310/154 |
| 3,483,410 | 12/1969 | Siegelman | 310/154 |
| 3,204,171 | 8/1965 | Alm | 310/181 |
| 3,201,625 | 8/1965 | Smith | 310/181 |
| 3,365,641 | 1/1968 | Iida | 318/350 |
| 3,471,730 | 10/1969 | Button | 310/181 |

*Primary Examiner*—Bernard A. Gilheany
*Assistant Examiner*—Thomas Langer
*Attorney*—Andrew E. Carlsen et al.

[57] ABSTRACT

A variable, multiple speed direct current electric motor having a low power requirement for multiple high speed operation and low variable speed operation. A direct current armature is rotatably mounted in a frame which includes a first and a second source of magnetic flux energy. One of the sources is of substantially constant magnitude and the other is adjustably variable. The sources of magnetic flux energy are axially spaced apart so that the magnetic field from each of them may be linked to different portions of the armature and its conductors along any given axial length thereof.

In various modes of operation the effect of the variable source of magnetic flux may be used in an additive or subtractive sense, with respect to the axially extending conductors or the armature to provide a multiple high speed operation having low driving voltage requirements for the armature supply, or in a variable low speed operation to materially reduce the driving current requirements for the armature supply.

The overall result is a motor providing improved performance characteristics over a wide range of speed of operation while reducing the power requirements and the complexity of the power supplies and controllers.

12 Claims, 7 Drawing Figures

PATENTED AUG 14 1973　　　　　　　　　　　3,753,068
SHEET 1 OF 3
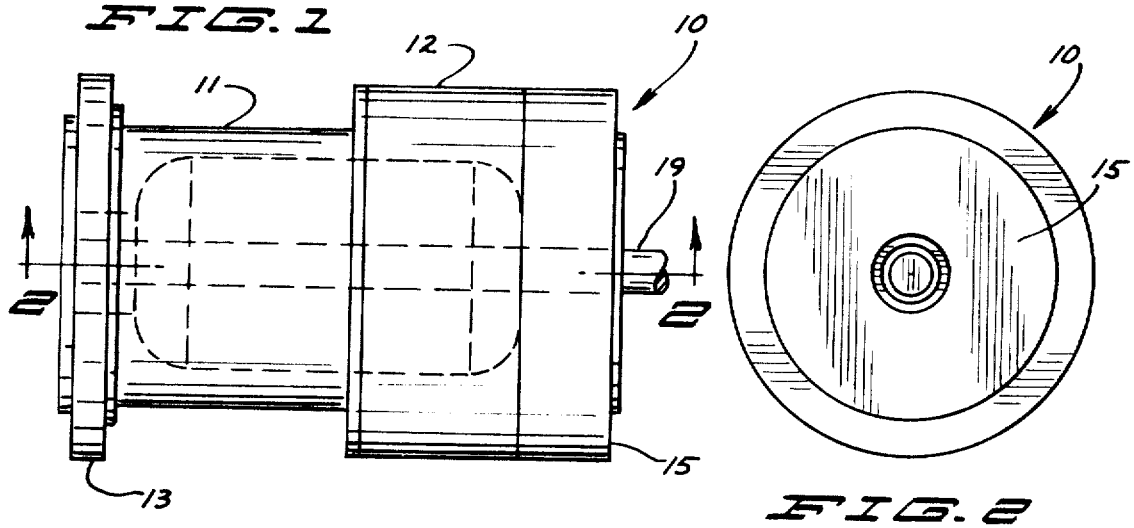
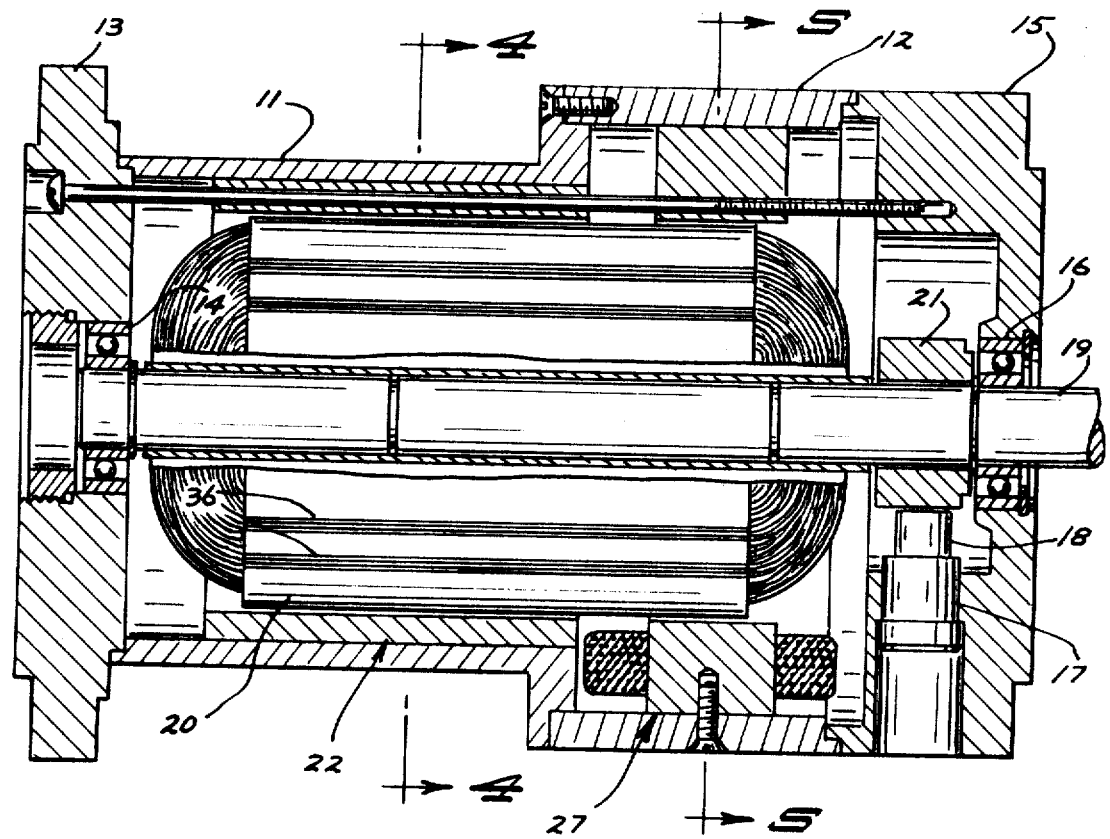
INVENTOR.
PETER WALKER JR.
BY
Carlsen Carlsen & Sturm
ATTORNEYS INVENTOR.
PETER WALKER JR.
BY
Carlsen Carlsen + Sturm
ATTORNEYS

CONTROLLED SPEED ELECTRIC MOTOR

SUMMARY OF THE INVENTION

The purpose of my invention is to supply a versatile variable speed direct current which may be useful in an environment in which close regulation of the speed may be required and a wide range of speeds may also be necessary. One example of such an application is a tape transport which is utilized to control the forward and reverse speed of travel of a magnetic tape as in a computer memory element.

In the last described environment, it is quite often necessary to cause a tape to be driven in a forward direction at a relatively low, very constant regulated speed and in another mode of operation to drive the tape in a reverse direction at a very high speed which may or may not be desired to be constant, it merely being sufficient to rapidly rewind the magnetic tape for further subsequent use. I have discovered that the use of separate magnetic fields which are common to the same armature in a D.C. motor will allow operation of a motor over a very wide range of speeds while at the same time providing a variable speed of operation about one of the wide range of speeds of operation in an uncomplicated, efficient manner.

Prior art devices have incorporated two separate motors or complicated controllers for driving the magnetic tape in the computer memory elements. In practicing the principles of my invention, I utilize a variable source of electrical energy for energizing the armature and a second variable source of electrical energy for energizing or controlling the magnitude and sense of a source of magnetic flux that is disposed adjacently, axially of a second constant source of magnetic flux in a direct current electric motor.

I further provide an electric motor which may be easily fabricated and assembled by utilizing a multiple, two part casing in combination with a pair of end cap members, each of which may be easily fabricated prior to assembly and then efficiently and accurately assembled into a completed motor including the rotatably journalled armature disposed thereinside.

DESCRIPTION OF THE DRAWINGS ILLUSTRATING A PREFERRED EMBODIMENT

FIG. 1 is a side elevational view of an electric D.C. motor embodying the principles of my invention;

FIG. 2 is an end elevational view of the right end of the apparatus shown in FIG. 1;

FIG. 3 is an enlarged partial sectional view of the apparatus shown in FIG. 1 taken along section line 3—3;

Figure 4:
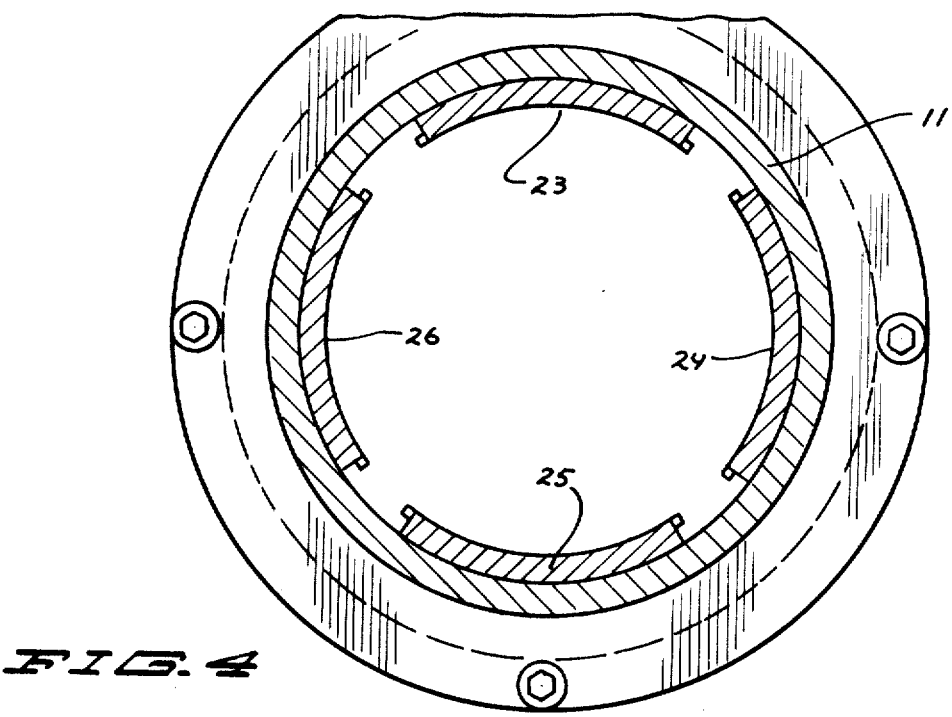
FIG. 4 is a partial sectional view of the apparatus shown in FIGS. 1, 2 and 3 taken along section line 4—4 on FIG. 3.
Figure 5:
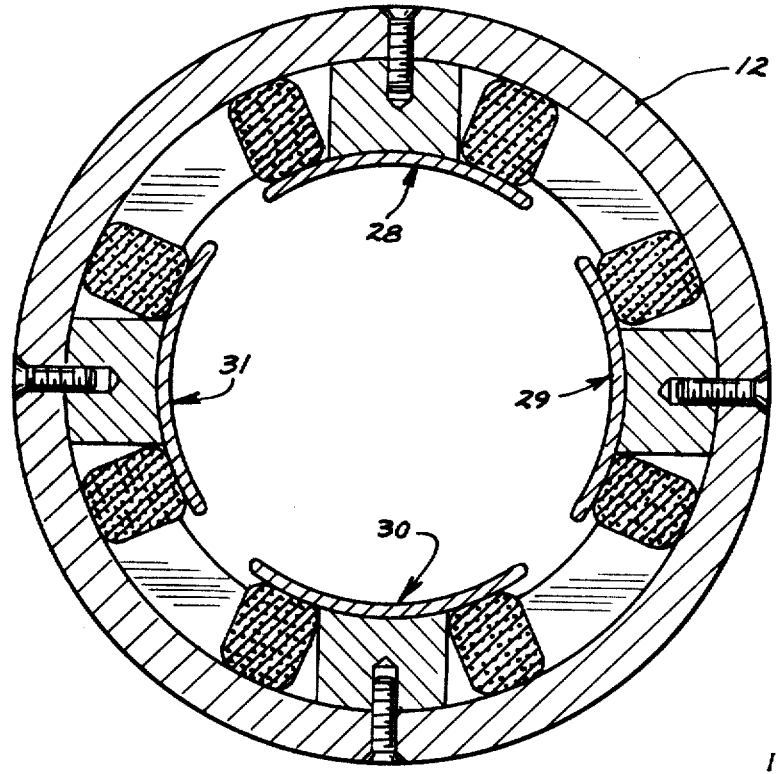
FIG. 5 is a further sectional view of a portion of the apparatus shown in FIG. 3 taken along section line 5—5.
Figure 6:
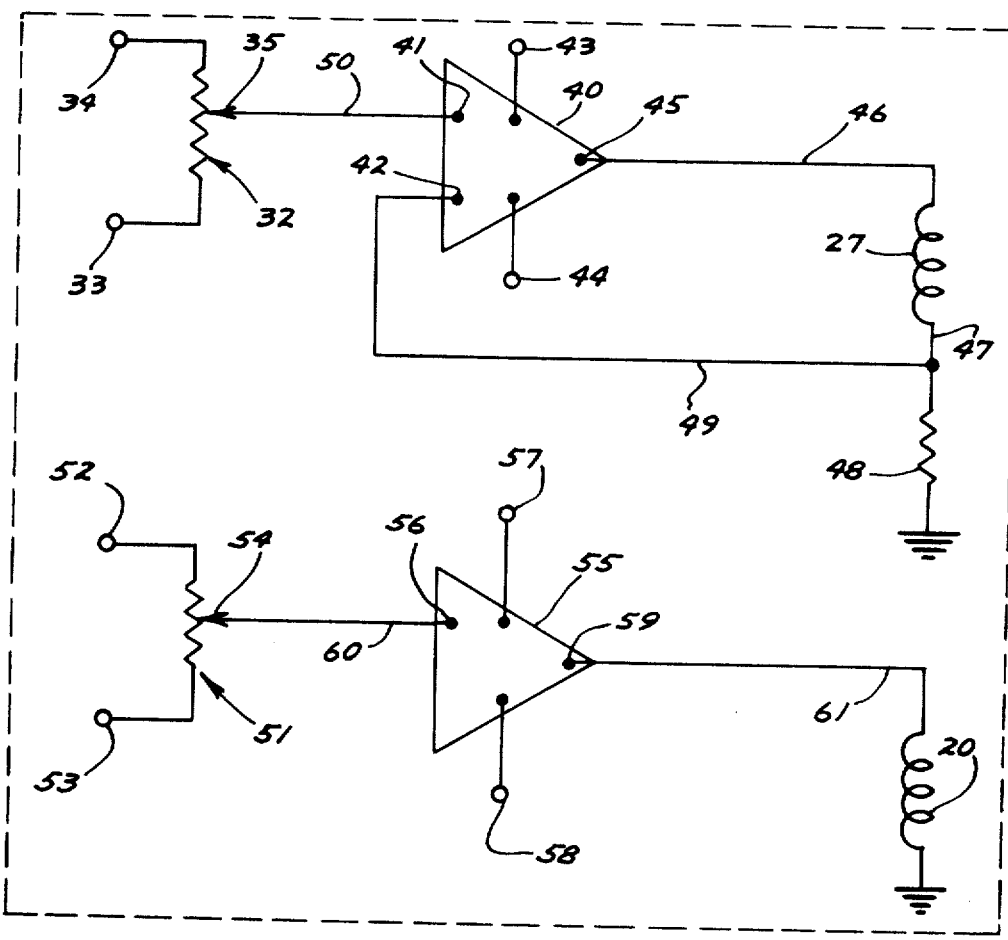
Figure 7:
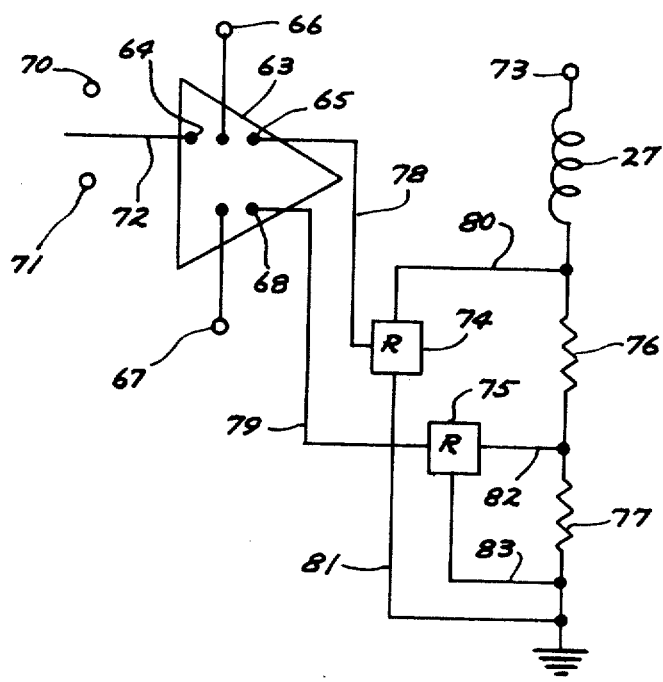

FIG. 6 is a simplified schematic drawing of a power supply means for energizing the motor shown in FIGS. 1, 2, 3, 4 and 5 in a variable speed of operation; and FIG. 7 is a simplified electrical schematic drawing illustrating a power supply means for energizing the variable magnetic source of energy of the illustrated embodiment to provide wide range different speeds of operation when combined with the portion of the power supply for the armature of the D.C. motor as in the lower half of FIG. 6.

DETAILED DESCRIPTION

Referring to FIGS. 1–5 inclusive, of the drawings, it will be seen that my improved motor consists of a frame 10 that is comprised of first and second axially adjacently disposed cylinders 11 and 12, a first end cap 13, having an armature shaft bearing 14, disposed at the left end and a second end cap 15, having a centrally disposed armature shaft bearing 16, disposed at the right end. End cap 15 is also provided with a plurality of brush holders 17 adapted to slidably receive current conducting brush members 18 to establish electrical connection to the commutator on an armature disposed within frame 10.

An armature 20 having a plurality of axially extending coils having longitudinally extending portions 36 disposed in circumferentially spaced apart slots on the outer periphery of armature 20, is securely mounted upon a shaft 19 that is rotatably journalled in bearings 14 and 16 in end cap members 13 and 15 respectively. A commutator 21 is shown disposed on shaft 19 adjacent to the right end of armature 20 and is connected to individual coils on armature 20 through suitable conductors (not shown) in a manner well known to those skilled in the art to which this invention pertains.

A constant magnitude source of magnetic energy, indicated generally by 22, is disposed in the first cylindrical section 11 of frame 10 and includes a plurality of circumferentially equal distantly spaced alternately radially polarized, axially extending sources of magnetic energy of substantially constant magnitude shown as consisting of arc shaped ceramic magnets 23, 24, 25 and A second source of magnetic energy is indicated generally as variable source of magnetic energy 27 disposed within the second cylindrical portion 12 of frame 10. Variable source of magnetic energy 27, also known as a field coil, is comprised of a plurality of windings disposed around suitable magnetically conductive poles and pole faces and are identified on FIG. 5 of the drawings as comprised of windings and poles 28, 29, 30 and 31, which are connected so as to provide alternately radially polarized variable sources of magnetic energy. The connection of the individual windings may easily be determined by those skilled in the art and hence the specific connections are not known in the drawings.

As may be seen in the drawings, a motor intended to be operated from a suitable source of direct current energy includes an armature 20, which may be connected to a suitable source of direct current energy and a coaxially disposed composite source of magnetic energy comprised of a constant magnitude source of magnetic energy 22 and a variable source of magnetic energy 27. Variable source of magnetic energy 27 is adapted to be connected to a suitable source of direct current energy which may vary in magnitude and polarity.

Referring now to FIG. 6, a complete block schematic diagram of control circuitry which may be operative to control the speed of operation of the motor of my invention is shown including an amplifier 40 that is operative to variably energize field coil 27 and a second amplifier 55 that is operative to variably energize armature 20.

Amplifier 40 is shown having a pair of input terminals 41 and 42, a pair of terminals and conductors 43 and 44 adopted to be connected to a suitable source of direct current energy (not shown) and an output terminal 45. Output terminal 45 is connected to field coil 27 through conductor 46. Field coil 27 is connected to ground through a further conductor 47 and a feedback resistor 48. Feedback resistor 48 is connected to input terminal 42 on amplifier 40 through conductor 49, for purposes of stabilizing the operation thereof.

Input terminal 41 on amplifier 40 is connected to a source of command signal comprised of a potentiometer winding 32 and a wiper 35 that is connected to terminal 41 through conductor 50. Potentiometer winding 32 is normally connected to a suitable source of direct current reference potential (not shown) through terminals 33 and 34. Wiper 35 on potentiometer 32 may be manually operated or might be suitably connected to a driven load member connected to shaft 19 to reflect the speed of operation or may, in many other manners, be utilized to supply a signal of appropriate sense and magnitude to amplifier 40 to provide an output therefrom which will cause energization of field coil 27 in such a manner as to maintain the speed of shaft 19 at a predetermined, desired value.

Amplifier 55 has an input terminal 56, a pair of terminals 57 and 58 adapted to be connected to a suitable source of direct current (not shown) and an output terminal 59. Output terminal 59 is connected to armature 20 through conductor 61 and commutator 21. Armature 20 is shown schematically as having its opposite end connected to ground.

Input terminal 56 on amplifier 55 is connected to a wiper 54 on potentiometer winding 51 through conductor 60. Potentiometer winding 51 is shown adapted for connection to a suitable source of direct current energy (not shown) through terminals 52 and 53. Wiper 54 on potentiometer 51 may be positioned in accordance with the desires of an operator or may be positioned in accordance with a function determined by control apparatus (not shown) which may be determinable by those skilled in the art to which my invention pertains.

Terminals 57 and 58 are adapted for connection to a further suitable source of direct current energy (not shown) of appropriate magnitude and polarity as determined by the characteristics of armature 20 and the desired operation of the motor. Again, such characteristics are readily ascertainable by one skilled in the art to which my invention pertains and are therefore left to the discretion of the individual which, in turn, must be guided by the electrical characteristics of the specific apparatus to which my invention is applied and the environment in which such apparatus is operable.

FIG. 7 shows further control apparatus which may be substituted for that shown in the top half of FIG. 6 to operate a motor embodying the principles of my invention at different speeds of operation as distinguished from controlling the motor at a constant speed about one particular speed of operation. It may be assumed that suitable energization of armature 20 may be affected by apparatus similar in characteristics to that shown on the lower part of FIG. 6 of the drawings.

In FIG. 7 an amplifier 63 is shown having an input terminal 64, a pair of terminals 66 and 67 adapted for connection to a suitable source of direct current energy (not shown) and a pair of output terminals 65 and 68. Input terminal 64 is shown connected to the movable contact on a single-pole double-throw switching arrangement through conductor 72. A movable contact connected to conductor 72 is operable to be energized from a first stationary contact 70 or a secondary stationary contact 71. Contacts 70 and 71 are adapted to be connected to sources of electrical energy (not shown) of differing magnitude, polarity or other characteristics so as to effect energization of output terminals 65 or 68 on amplifier 63 in accordance with which of terminal 70 or 71 the movable contact connected to conductor 72 happens to be in electrically conductive engagement. Terminals 66 and 67 are adapted for connection to a suitable source of electrical energy (not shown).

Field coil 27 has one end connected to an input terminal 73 and the other end connected to ground through resistor 76 and resistor 77. Terminal 73 is adapted to be connected to a suitable source of direct current energy which has one of its terminals connected to ground so as to complete a circuit through field coil 27.

Output terminal 65 is shown connected to a relay 74 through conductor 78. Relay 74 may be operative to complete a circuit from the top end of resistor 76 through conductor 80, relay 74 and conductor 81 to ground. Output terminal 68 is shown connected to relay 75 through conductor 79. Relay 75 is operative to complete a circuit from the junction intermediate resistors 76 and 77 through conductor 82, relay 75 and conductor 83 to ground.

OPERATION

In operation, in the mode illustrated in FIG. 6 of the drawings, the armature 20 is energized at a suitable level determined by the ultimate desired speed of operation. This may be done by positioning wiper 54 on potentiometer winding 51 and, perhaps, simultaneously energizing field coil 27 by initially positioning wiper 35 on potentiometer winding 32. For a given load, this will establish a predetermined speed of operation.

Should the load vary a suitable means (not shown) connected to a load may be used to vary the magnitude of the source of potential connected between terminals 52 and 53 or physically move wiper 54 on potentiometer winding 51 to vary the input to amplifier 55 to cause an increase or decrease in the energization of armature 20 to thereby modify the speed of the motor.

Alternatively the magnitude of the source of potential connected between terminals 33 and 34 or physically move wiper 35 on potentiometer winding 32 to vary the input to amplifier 40 to cause an increase or decrease in the energization of field coil 27 to thereby modify the speed of the motor in accordance with the change in magnetic energy supplied by field coil 27 with respect to the constant magnitude source of energy 22.

FIG. 7 illustrates a modified apparatus for energizing field coil 27 from a source of potential of one given polarity. For the operation of the apparatus of FIG. 7, it will be assumed that armature 20 is again energized at a predetermined level which may be determined by initially setting wiper 54 on potentiometer winding 51. In the operation of the apparatus of FIG. 7, it may be seen that field coil 27 may be connected so as to be of opposite polarity with respect to the magnetic energy supplied from constant energy source 22. Under the conditions shown with the movable contact 72 in a neutral position, neither relay 74 nor relay 75 are energized and the magnetic energy provided by field coil 27 is at its lowest level; hence, the total amount of magnetic energy available to the armature is at its highest level and the motor will run at a relatively slow speed.

When it is desired to increase the speed, movable wiper 72 may be moved to, for example, stationary contact 71 so as to cause energization of relay 75 which completes a circuit shunting resistor 77 to increase the energization of field coil 27. In one application, the increased magnetic energy is subtracted from the magnetic energy supplied by the constant magnitude source 22 so as to reduce the overall effective magnetic energy which causes a resultant increase in speed of the armature. It may be seen that the speed may be further increased by energizing relay 74 which effectively shunts resistors 76 and 77 to obtain a still higher speed.

It may now be apparent to those skilled in the art that amplifier 40 might include the features of amplifier 63 and its suitable additional circuitry so that a series of discrete steps with variable control at each step of different speeds of the motor could be provided to form a complete wide range multi-speed, variable speed motor.

I claim:

1. A variable speed motor comprising in combination;
    a frame;
    an armature rotatably journalled for rotation within said frame, said armature being comprised of a plurality of coil windings, each having conductors extending axially of said armature from end to end thereof;
    a first source of magnetic energy disposed concentrically of the axis of rotation of said armature and in magnetic energy transmitting relationship with a portion of the axial length of the conductors on said armature;
    a second source of magnetic energy disposed concentrically of the axis of rotation of said armarture and in magnetic energy transmitting relationship with a second portion of the axial length of the conductors on said armature;
    first and second sources of magnetic energy being axially displaced and in axial alignment one of said sources of magnetic energy being variable.

2. The apparatus of claim 1 in which said one of the sources of magnetic energy is of reversible polarity.

3. The apparatus of claim 1 in which said one of the sources of magnetic energy is of variable magnitude.

4. The apparatus of claim 1 in which said one of the sources of magnetic energy is of variable magnitude and reversible polarity.

5. The apparatus of claim 1 in which said one of the sources of magnetic energy is comprised of a plurality of coil windings.

6. The apparatus of claim 1 in which the other of the sources of magnetic energy is comprised of a plurality of low permeability, radially polarized members.

7. The apparatus of claim 1 in which the sources of magnetic energy are mounted in adjacently disposed cylindrical members concentrically of the armature.

8. The apparatus of claim 7 in which a pair of end cap members, each having a centrally located bearing member receiving one end of the armature, are disposed on respective open ends of the cylindrical members and connecting means extend intermediate said end cap members.

9. In combination with a variable speed motor;
    first and second sources of magnetic energy, at least one of which includes a coil winding disposed axially of an armature of a motor, said armature including coil windings having conductors extending from end to end of said armature;
    a source of electrical energy;
    first circuit means connecting said source of energy to one of the sources of magnetic energy in a motor; and
    second circuit means connecting said source of electrical energy to the armature on said motor.

10. The apparatus of claim 9 in which the first circuit means includes means for controlling the magnetiude and sense of the electrical energy transmitted therethrough in accordance with the speed of the motor.

11. The apparatus of claim 9 in which the first circuit means includes means for variably energizing the source of magnetic energy.

12. The method of controlling the speed of a rotating armature including continuous end to end conductors, having a finite axial length, which comprises;
    subjecting an armature to a first source of magnetic energy over a portion of its axial length;
    subjecting an armature to a second source of magnetic energy over another portion of its axial length; and
    varying the magnitude or sense of one of said sources of magnetic energy in a predetermined manner.

* * * * *